Aug. 11, 1964 J. N. LA FIANDRA ETAL 3,144,584
PORTABLE STROBOSCOPE
Filed Nov. 22, 1961
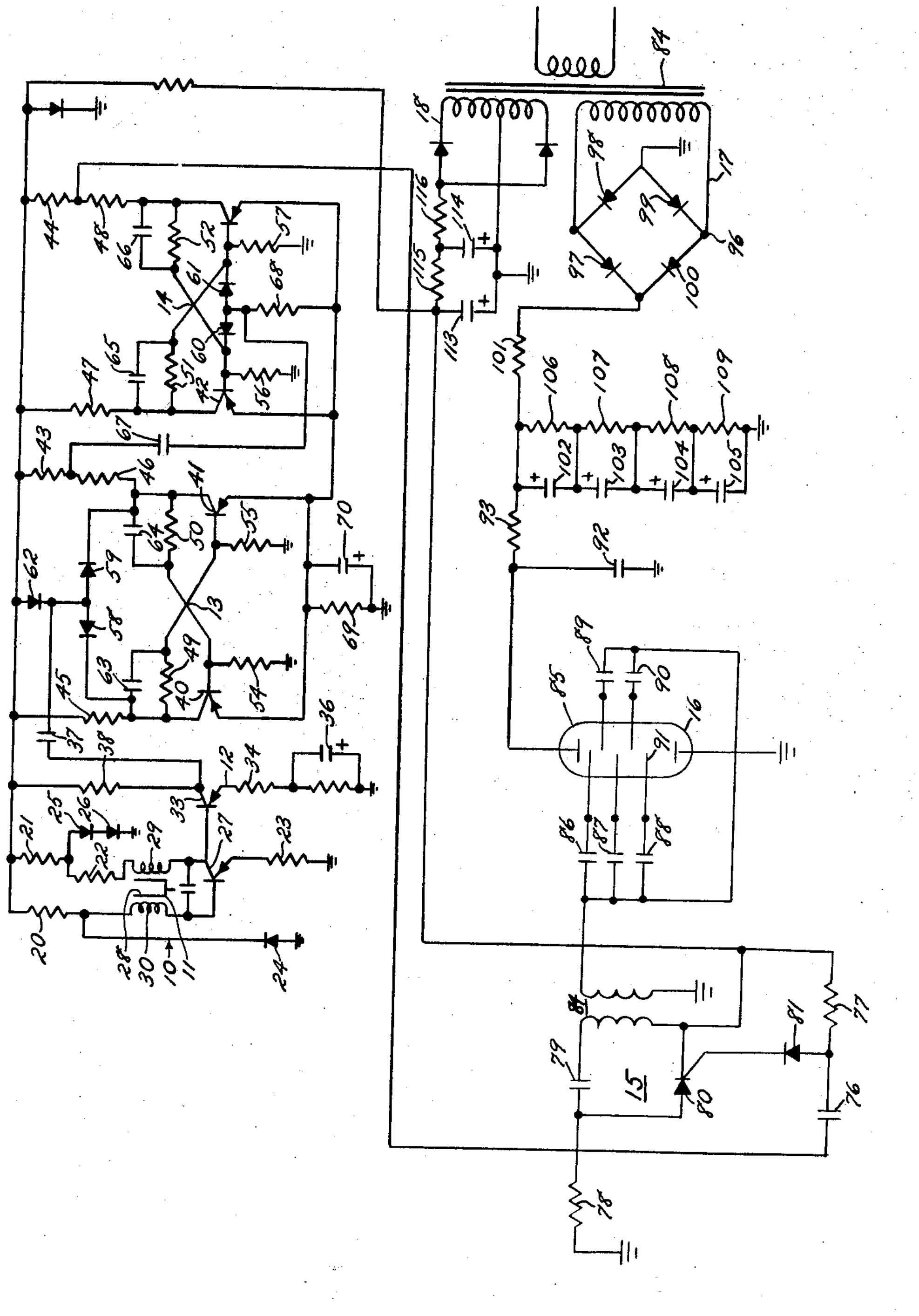

3,144,584

PORTABLE STROBOSCOPE

Joseph N. La Fiandra, Yonkers, and Stephen Einson and Jerome Spielberg, New York, N.Y., assignors to Loral Electronic Corporation, Bronx, N.Y., a corporation of New York Filed Nov. 22, 1961, Ser. No. 154,182
1 Claim. (Cl. 315—241)

This invention relates generally to the field of calibrated stroboscopes incorporating a conductive gas-filled tube firing at pre-determined frequency, and more particularly to an improved portable device of this type having simplified transistorized circuits permitting operation from a single source of power.

It is among the principal objects of the present invention to provide a stroboscopic device of extremely compact configuration, whereby the same may be readily carried from location to location, and which may, if desired, be operated by means of self-contained batteries.

Another object of the invention lies in the provision of a portable stroboscope of the type described which may employ a tuning fork oscillator of the type employed in larger stroboscopic units, whereby the accuracy of calibration of the same may be directly comparable with larger, less portable units.

A further object of the invention lies in the provision of a portable stroboscope having an improved triggering circuit for firing the gas-filled tube, which reduces the number of operating voltages which must be supplied to the device for correct functioning.

Still another object of the invention lies in the provision of an improved portable stroboscope of the class described, in which the cost of fabrication may be of a reasonably low order, with consequent wide sale, distribution and use.

A feature of the invention lies in the extensive use of solid state electronic devices resulting in unusually low power consumption.

These objects and features, as well as other incidental ends and advantages, will more fully appear in the progress of the following disclosure, and be pointed out in the appended claim.

In the drawing, the single figure is an electrical schematic diagram showing an embodiment of the invention.

In accordance with the invention, the device generally indicated by reference character 10, comprises broadly: a tuning fork oscillator element 11, a buffer amplifier element 12, a first flip-flop circuit 13, a second flip-flop circuit 14, a triggering circuit 15, a stroboscope lamp element 16, a stroboscope lamp power supply 17, and a circuitry power supply 18.

The tuning fork oscillator element 11 includes resistors 20, 21, 22 and 23, germanium diodes 24, 25 and 26, as well as a transistor 27 and a tuning fork 28. The drive coil 29 of the tuning fork 28 is in series with the collector circuit of the transistor 27, and the pick-up coil 30 thereof is placed in series with the base circuit of the same transistor. Positive feedback is obtained by adjusting the polarity of the coils 30 and 29. Power for driving the fork 28 is provided by the transistor 27. Resistor 20, in conjunction with diode 24, provides a temperature-compensated base bias. Resistor 22 limits the amount of voltage applied to the drive coil 29 of the fork 28. Resistor 23 provides emitter degeneration to assist in stabilizing the gain of the oscillator element. Resistor 21, diodes 25 and 26, form a shunt zener diode regulator which prevents voltage variations of the supply voltage from affecting the frequency stability of the oscillator.

The output of the transistor 27 is fed to the buffer amplifier element 12 which includes transistor 33, resistors 32, 34, and 35, capacitor 36, and condenser 37.

The element 12 serves the purpose of decreasing the rise and fall times of the square wave signal from the oscillator element 11, and is driven into cutoff and saturation by such rise and fall, as is well-known in the art. The result is a sharper signal to drive the flip-flop circuits 13 and 14. The element 12, resistor 32 is the load resistor for the buffer stage. Resistor 34 provides emitter degeneration so that the buffer element presents a high input impedance to the oscillator, thus not loading it to any great extent. Resistor 35 sets the bias level for the transistor 33 so that direct coupling can be used between transistors 27 and 33. Capacitor 36 is a bypass capacitor. Condenser 37 is an interstage coupling capacitor, and also provides differentiation of the square wave output of the oscillator element 11.

The transistors 40, 41, 41' and 42 are employed in two count-down multivibrators forming the flip-flop circuits 13 and 14. The multivibrators include collector load resistors 43, 44, 45, 46, 47 and 48, as well as voltage divider resistors 49, 50, 51, 52, 54, 55, 56 and 57, providing proper biasing so that the transistors 40–42 will remain in either the "on" or "off" state under all temperature variations. Reference characters 58, 59, 60 and 61 designate steering diodes which are used to permit only one polarity pulse to trigger the multi-vibrators to provide a frequency division. Reference character 62 indicates a clamping diode for controlling negative pulses. 63, 64, 65 and 66 are speed-up capacitors permitting high-frequency operation, while capacitor 67 and resistor 68 form a differentiation network for the output of the first flip-flop circuit 13. Resistor 69 and capacitor 70 provide an emitter bias voltage for both circuits 13 and 14. Current is essentially constant through resistor 69, while capacitor 70 absorbs any switching transients across resistor 69. Resistor 71 and zener diode 72 serve the dual function of dropping the supply voltage and regulating against voltage variations.

The triggering circuit 15 serves to discharge the stroboscope lamp element 16 at regular periodic intervals, and operates on the output from the second flip-flop circuit 14 which is in the form of a square wave. The signal is fed to capacitor 76 and resistor 77 which act as a differentiation network. This network, in conjunction with resistor 78, capacitor 79, silicon-controlled rectifier 80, diode 81, and transformer 84, comprises a means by which a low-voltage pulse of approximately 5 volts can be used to generate a high-voltage triggering pulse of approximately 6,000 volts to fire the element 16. Pulses from capacitor 76 and resistor 77 are applied to diode 81 which will pass only positive pulses. The positive pulses will turn on the normally "off" silicon-controlled rectifier 80 which will remain in the "on" position until the passed voltage is dissipated. When the silicon-controlled rectifier 80 is in the "off" position, the capacitor 79 will charge through resistor 78 from the supply voltage. When the positive pulse is applied to the silicon-controlled rectifier 80, it will, in turning to the "on" position, present a very low impedance, so that the capacitor 79 will be effectively shorted across the primary winding of the transformer 84. A surge of current will then flow through capacitor 79, silicon-controlled rectifier 80, and transformer 84, which will generate a high voltage in the secondary winding of the transformer which is of a step-up type. When the capacitor has discharged, the silicon-controlled rectifier 80 will return to the "off" condition as the current drops below the holding current of the silicon-controlled rectifier 80.

The stroboscope lamp element 16 is preferably of a xenon gas type which emits a white light. The lamp 85 receives its signals through capacitors 86, 87, 88, 89 and 90, which transmit current to the grids 91 thereof. Current for firing the tube is provided by storage capacitor 92, which is charged through resistor 93.

The stroboscopic lamp power supply 17 includes a diode bridge including diodes 97, 98, 99 and 100, a filter resistor 101, as well as filter capacitors 102, 103, 104 and 105, operating in conjunction with filter equalizing resistors 106, 107, 108 and 109.

The circuitry power supply 18 provides current for all of the circuits with the exception of the lamp element 16, and includes full-wave rectifiers 111 and 112, filter capacitors 113 and 114, as well as filter resistors 115 and 116.

It may thus be seen that we have invented novel and highly useful improvements in portable stroboscopic construction, in which, by means of a silicon-controlled rectifier, the low-voltage power supply 18 may be used to trigger the high-voltage power supply 17 without resort to complicated triggering circuits, or the necessity of more than a single low-voltage power supply in conjunction with the high-voltage power supply used for discharging the stroboscopic lamp. This simplification of structure permits compactness of the entire device, heretofore unobtainable in the prior art, and completely eliminates the necessity for using thyratron and other vacuum tubes having the usual unreliability associated with such devices, and the high current consumption necessary to operate them. Since the device uses a conventional tuning fork oscillator element, no sacrifice in accuracy or reliability is present, so that the device may be used with the same confidence as bulkier prior art devices.

We wish it to be understood that we do not consider the invention limited to the precise details of structure shown and set forth in this specification, for obvious modifications will occur to those skilled in the art to which the invention pertains.

We claim:

In a stroboscopic device, a tuning fork oscillator element, a buffer amplifier element receiving signals from said tuning fork oscillator element, a plurality of flip-flop circuits interconnected to said buffer amplifier element for dividing the frequency of signals received therefrom, a stroboscope lamp having a plurality of grids, triggering means actuated by frequency divided signals for periodically discharging said lamp, a single low-voltage power supply for powering said tuning fork oscillator element, buffer amplifier element, flip-flop circuit and triggering means, and a high-voltage power supply for powering said stroboscope lamp; said triggering means including a condenser chargeable to a low voltage, a step-up transformer, the primary winding of which is selectively connected to said condenser, the secondary winding of which is connected to the grids of said stroboscope lamp, and a silicon controlled rectifier means receiving output signals from said flip-flop circuits, and periodically shorting said condenser to said primary winding of said transformer.

References Cited in the file of this patent

UNITED STATES PATENTS

| | | |
|---|---|---|
| 2,706,785 | Volz | Apr. 19, 1955 |
| 2,906,924 | Frungel | Sept. 29, 1959 |
| 3,049,642 | Quinn | Aug. 14, 1962 |